(12) United States Patent
Ohashi et al.

(10) Patent No.: US 11,274,354 B2
(45) Date of Patent: Mar. 15, 2022

(54) STEEL MATERIAL, CRANKSHAFT, AND AUTOMOBILE COMPONENT

(71) Applicants: DAIDO STEEL CO., LTD., Nagoya (JP); Honda Motor Co., Ltd., Tokyo (JP)

(72) Inventors: Ryosuke Ohashi, Aichi (JP); Ayumi Yamazaki, Aichi (JP); Yushi Fujinaga, Wako (JP); Kentaro Shimada, Wako (JP); Ryuta Motani, Wako (JP)

(73) Assignees: DAIDO STEEL CO., LTD., Nagoya (JP); HONDA MOTOR CO., LTD., Tokyo (JP)

( * ) Notice: Subject to any disclaimer, the term of this patent is extended or adjusted under 35 U.S.C. 154(b) by 534 days.

(21) Appl. No.: 15/479,121

(22) Filed: Apr. 4, 2017

(65) Prior Publication Data
US 2017/0284452 A1    Oct. 5, 2017

(30) Foreign Application Priority Data

Apr. 5, 2016 (JP) .............................. JP2016-076209
Mar. 8, 2017 (JP) .............................. JP2017-043952

(51) Int. Cl.
*C21D 9/30*     (2006.01)
*C22C 38/60*    (2006.01)
(Continued)

(52) U.S. Cl.
CPC ................ *C21D 9/30* (2013.01); *C21D 1/06* (2013.01); *C22C 38/001* (2013.01);
(Continued)

(58) Field of Classification Search
None
See application file for complete search history.

(56) References Cited

U.S. PATENT DOCUMENTS 6,083,455 A      7/2000  Kurita et al.
6,797,231 B2 *   9/2004  Matsui .................... C21C 7/06
                                                       420/109
(Continued)

FOREIGN PATENT DOCUMENTS

JP    H01-168848 A    7/1989
JP    H10-219393 A    8/1998
(Continued)

OTHER PUBLICATIONS

Davis, J.R. Alloying—Understanding the Basics—8. High-Strength Low-Alloy Steels, (pp. 193-209). ASM International. (2001). (Year: 2001).*

(Continued)

*Primary Examiner* — Jophy S. Koshy
*Assistant Examiner* — Joshua S Carpenter
(74) *Attorney, Agent, or Firm* — McGinn IP Law Group, PLLC (57) ABSTRACT

The present invention provides a steel material which is excellent in both of the strength (particularly, fatigue strength) and the manufacturability (particularly, bending straightening properties), and thus can be used as an automobile component such as a crankshaft by being formed into a product shape, being subjected to a high strength treatment such as a nitrocarburizing treatment, and then being subjected to the bending straightening.

9 Claims, 1 Drawing Sheet

(51) Int. Cl.
- *C22C 38/50* (2006.01)
- *C22C 38/48* (2006.01)
- *C22C 38/46* (2006.01)
- *C22C 38/44* (2006.01)
- *C22C 38/42* (2006.01)
- *C22C 38/06* (2006.01)
- *C22C 38/04* (2006.01)
- *C22C 38/02* (2006.01)
- *C22C 38/00* (2006.01)
- *C23C 8/32* (2006.01)
- *C21D 1/06* (2006.01)
- *F16C 3/06* (2006.01)

(52) U.S. Cl.
CPC ............ *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/60* (2013.01); *C23C 8/32* (2013.01); *F16C 3/06* (2013.01); *F16C 2204/62* (2013.01); *F16C 2204/74* (2013.01); *F16C 2220/46* (2013.01); *F16C 2223/16* (2013.01)

(56) References Cited

U.S. PATENT DOCUMENTS

| | | | |
|---|---|---|---|
| 8,911,566 B2 * | 12/2014 | Saito | B21K 1/08 |
| | | | 148/320 |
| 9,255,314 B2 | 2/2016 | Kubota et al. | |
| 2007/0144619 A1 * | 6/2007 | Asai | C22C 38/001 |
| | | | 148/318 |
| 2010/0139451 A1 | 6/2010 | Saito et al. | |
| 2011/0132138 A1 | 6/2011 | Saito et al. | |
| 2014/0322066 A1 | 10/2014 | Higashida et al. | |
| 2015/0083279 A1 | 3/2015 | Saito et al. | |

FOREIGN PATENT DOCUMENTS

| | | |
|---|---|---|
| JP | 2007-197812 A | 8/2007 |
| JP | 2010-7143 A | 1/2010 |
| JP | 2010-159486 A | 7/2010 |
| JP | 2011-115822 A | 6/2011 |
| JP | 5716640 B2 | 5/2015 |
| WO | WO 2012/070349 A1 | 5/2012 |
| WO | WO 2016/143812 A1 | 9/2016 |

OTHER PUBLICATIONS

Indian Office Action dated Oct. 30, 2019, in Indian Patent Application No. 201714012142 with an English translation.

Japanese Office Action, dated Nov. 24, 2020, in Japanese Patent Application No. 2017-043952 and English Translation thereof.

* cited by examiner

STEEL MATERIAL, CRANKSHAFT, AND AUTOMOBILE COMPONENT

FIELD OF THE INVENTION

The present invention relates to a steel material, a crankshaft, and an automobile component.

BACKGROUND OF THE INVENTION

Typically, an automobile component such as a crankshaft is manufactured by casting or forging; however, in a case where strength and rigidity are emphasized, a hot-forged carbon steel or a hot-forged low alloy steel is used as the automobile component. In addition, when the higher strength is required, a high frequency induction hardening treatment or a nitrocarburizing treatment is performed. In this case, it is necessary to perform a bending straightening process after the aforementioned treatment.

Accordingly, the steel material used for manufacturing the automobile component such as the crankshaft requires strength and excellent straightening properties.

For example, Patent Document 1 discloses a nitrocarburizing microalloyed material which contains C, Si, Mn, S, Al, Ti and N at a specific range with the balance being Fe and impurities, in which the content of P and Cr in the impurities is in the specific range, and a specific component satisfies a specific expression. In addition, such a nitrocarburized component is stable, and has high bending fatigue strength of equal to or greater than 600 MPa and excellent bending straightening properties under the various nitrocarburizing conditions, particularly, even in a case where water cooling is performed in a cooling step after the nitrocarburizing, and thus is suitably used for a crankshaft of an automobile.

In addition, for example, Patent Document 2 discloses a nitrocarburized microalloyed steel member formed of a microalloyed steel which contains a nitrocarburized layer on a surface, in which a cross-section of the steel except for the nitrocarburized layer has a ferrite+pearlite structure, and as a composition of the steel, the steel contains Fe as a main component and contains C, Si, Mn, S, Cu, Ni and Cr in a specific range, and the specific component satisfies a specific expression. Further, it is described in Patent Document 2 that such a nitrocarburized microalloyed steel member has sufficient bending straightening properties while securing the fatigue strength at a certain level.

Patent Document 1: WO 2012/070349
Patent Document 2: JP-A-2007-197812

SUMMARY OF THE INVENTION

For example, the steel material in the background art, disclosed in Patent Documents 1 and 2 has insufficient strength (fatigue strength) or manufacturability (bending straightening properties) in some cases. In addition, it has been expected to find a steel material having excellent strength (fatigue strength) and manufacturability (bending straightening properties) as compared with the background art.

An object of the present invention is to solve the above problems.

In other words, an object of the present invention is to provide a steel material which is excellent in both of the strength (particularly, fatigue strength) and the manufacturability (particularly, bending straightening properties), and thus can be used as an automobile component such as a crankshaft by being formed into a product shape, being subjected to a high strength treatment such as a nitrocarburizing treatment, and then being subjected to the bending straightening. In addition, an object of the present invention is to provide an automobile component such as a crankshaft formed of the steel material.

In order to solve the above problems, the inventors of the present invention have extensively studied and completed the present invention.

The present invention relates to the following items (1) to (6).

(1) A steel material including, in terms of % by mass:
C: 0.20% to 0.35%;
Si: 0.01% to 0.35%;
Mn: 0.55 to 1.50%;
Cu: equal to or less than 0.60%;
Ni: equal to or less than 0.30%;
S: 0.01% to 0.15%;
Cr: 0.01% to 0.20%;
Mo: 0.01% to 0.05%;
s-Al: equal to or less than 0.020%;
Ti: equal to or less than 0.040%;
N: 0.003% to 0.030%;
Ca: 0.0003% to 0.0060%; and
O: equal to or less than 0.010%,
with the balance being Fe and unavoidable impurities,
in which Expression 1≥0.43 is satisfied in a case where Expression 1=[C]+0.07×[Si]+0.16×[Mn]+0.19×[Cu]+0.17×[Ni]+0.20×[Cr]+0.40×[Mo] is established,
Expression 2≥0.38 is satisfied in a case where Expression 2=0.55×[C]+0.06×[Si]+0.18×[Mn]+0.09×[Cu]+0.47×[Mo]+[Cr] is established, and
1.77≤Expression 3≤3.20 is satisfied in a case where Expression 3=11×[Ca]/([N]+1.5×[O]) is established,
in which each [ ] in Expressions 1 to 3 indicates a content of the element shown therein in terms of % by mass.

(2) The steel material according to (1), in which, in a case where S0 represents the entire number (number/mm$^2$) of sulfides having a diameter of equal to or greater than 1.5 μm within 1 mm$^2$ of a cross section parallel to a rolling direction, S1 represents the number (number/mm$^2$) of sulfides which have a diameter of equal to or greater than 1.5 μm within 1 mm$^2$ of the cross section parallel to the rolling direction and which contain Ca of equal to or greater than 2.0%, and Expression 4=S1/S0 is established, Expression 4≥0.15 is satisfied.

(3) The steel material according to (1) or (2), further including, in terms of % by mass:
at least one selected from the group consisting of
V: equal to or less than 0.50%;
Nb: equal to or less than 0.50%; and
W: equal to or less than 2.0%.

(4) The steel material according to any one of (1) to (3), further including, in terms of % by mass:
one kind or two or more kinds of
Bi: equal to or less than 0.30%;
Pb: equal to or less than 0.30%;
Mg: equal to or less than 0.020%;
Se: equal to or less than 0.30%;
Te: equal to or less than 0.15%;
Sn: equal to or less than 0.040%;
Sb: equal to or less than 0.040%;
REM: equal to or less than 0.05%;
Zr: equal to or less than 0.50%; and
B: equal to or less than 0.0150%.

(5) An automobile component obtained by hot-forging and nitrocarburizing the steel material according to any one of (1) to (4).

(6) A crankshaft obtained by hot-forging and nitrocarburizing the steel material according to any one of (1) to (4).

According to the present invention, it is possible to provide a steel material which is excellent in both of the strength (particularly, fatigue strength) and the manufacturability (particularly, bending straightening properties), and thus can be used as an automobile component such as a crankshaft by being formed into a product shape, being subjected to a high strength treatment such as a nitrocarburizing treatment, and then being subjected to the bending straightening. In addition, it is possible to provide an automobile component such as a crankshaft formed of the steel material.

DETAILED DESCRIPTION OF THE INVENTION

The present invention will be described.

The present invention relates to a steel material including, in terms of % by mass: C: 0.20% to 0.35%; Si: 0.01% to 0.35%; Mn: 0.55 to 1.50%; Cu: equal to or less than 0.60%; Ni: equal to or less than 0.30%; S: 0.01% to 0.15%; Cr: 0.01% to 0.20%; Mo: 0.01% to 0.05%; s-Al: equal to or less than 0.020%; Ti: equal to or less than 0.040%; N: 0.003% to 0.030%; Ca: 0.0003% to 0.0060%; and O: equal to or less than 0.010%, with the balance being Fe and unavoidable impurities, in which Expression 1≥0.43 is satisfied in a case where Expression 1=[C]+0.07×[Si]+0.16×[Mn]+0.19×[Cu]+0.17×[Ni]+0.20×[Cr]+0.40×[Mo] is established, Expression 2≥0.38 is satisfied in a case where Expression 2=0.55×[C]+0.06×[Si]+0.18×[Mn]+0.09×[Cu]+0.47×[Mo]+[Cr] is established, and 1.77≤Expression 3≤3.20 is satisfied in a case where Expression 3=11×[Ca]/([N]+1.5×[O]) is established, in which each [ ] in Expressions 1 to 3 indicates a content of the element shown therein in terms of % by mass.

Hereinafter, such a steel material is also referred to as "the steel material of the present invention".

The composition of the steel material of the present invention will be described.

The content of a C component is in a range of 0.20% to 0.35% by mass, and is preferably equal to or less than 0.32% by mass.

When the content of the C component is within the above-described range, the steel material of the present invention and the automobile component (including a crankshaft, the same applies hereafter) formed of the steel material have enhanced fatigue strength and excellent straightening properties. When the content of the C component is excessively high, the straightening properties and the machinability tend to be deteriorated.

Note that, the straightening properties in the present invention mean that it is possible to easily and strictly perform a straightening process (a process of returning to the original shape) of deformation (bending) of the steel material which is generally formed by performing nitrocarburizing treatment. In a case where the straightening properties are reduced or deteriorated, cracks are generated in the steel material at the time of straightening the deformation of the steel material, or the steel material does not return to the original state.

The content of a Si component is in a range of 0.01% to 0.35% by mass, and is preferably equal to or greater than 0.05% by mass. Further, the content of the Si component is preferably equal to or less than 0.30% by mass, and is further preferably equal to or less than 0.25% by mass.

Si is used as a deoxidizing agent during steel production, and when the content thereof is within the above-described range, the steel material of the present invention and the automobile component formed of the steel material have the enhanced fatigue strength.

When the content of the Si component is within the above-described range, the steel material of the present invention and the automobile component formed of the steel material have enhanced fatigue strength and the excellent straightening properties. When the content thereof is excessively high, the straightening properties tend to be deteriorated.

The content of a Mn component is in a range of 0.55 to 1.50% by mass, and is preferably equal to or greater than 0.70% by mass. In addition, the content of the Mn component is preferably equal to or less than 1.20% by mass.

Mn is an essential element for forming a Mn-based sulfide contributing to machinability improvement.

When the content of the Mn component is within the above-described range, the steel material of the present invention and the automobile component formed of the steel material has enhanced fatigue strength and the excellent straightening properties. When the content thereof is excessively high, pearlite volume fraction becomes higher, and thus the straightening properties tend to be deteriorated. When the content thereof is excessively low, the fatigue strength tends to be deteriorated.

The content of a S component is in a range of 0.01% to 0.15% by mass, and is preferably equal to or less than 0.12% by mass.

S component is an essential element with Mn for forming a Mn-based sulfide contributing to machinability improvement. When the content of the S component is excessively low, the amount of sulfide generated is insufficient and thus the machinability becomes insufficient. In contrast, when the content of the S component is excessively high, the toughness and ductility of the steel material of the present invention are impaired, and thus the inclusion becomes origination of fatigue deterioration, whereby the fatigue strength tends to be deteriorated.

The content of a Cu component is equal to or less than 0.60% by mass, is preferably equal to or less than 0.45% by mass, and is further preferably equal to or less than 0.30% by mass. In addition, the content thereof is preferably equal to or greater than 0.01% by mass.

When the content of the Cu component is within the above-described range, yield strength is enhanced, and a compound layer which can be formed in the case where the nitrocarburizing treatment is performed is relatively thin, and thus the steel material of the present invention and the automobile component formed of the steel material have the enhanced fatigue strength.

When the content of the Cu component is excessively high, the hardness after hot forging is increased, whereby it is likely that the machinability is deteriorated, and the hot forgeability is also impaired. In this case, it leads to cost increase. Further, when a large amount of Cu is added, Cu segregates at the grain boundary of steel, thereby inducing hot cracking.

The content of an Ni component is equal to or less than 0.30% by mass, is preferably equal to or less than 0.25% by mass, and is further preferably equal to or less than 0.20% by mass. In addition, the content thereof is equal to or greater than 0.01% by mass.

When the content of the Ni component is within the above-described range, the ductility of pearlite in the nitride layer is improved, and thus the straightening properties of the steel material of the present invention and the automobile component formed of the aforementioned steel materials are improved.

When the content of the Ni component is excessively high, the hardness after hot forging is increased, whereby it is likely that the machinability is deteriorated, and the hot forgeability is also impaired. In this case, it leads to cost increase.

The content of a Cr component is in a range of 0.01% to 0.20% by mass, and is preferably equal to or less than 0.15% by mass.

The Cr component enhances the fatigue strength and toughness of steel. When the content thereof is excessively high, in a case of performing the nitrocarburizing treatment, a large amount of the nitrides are generated, and thus the bending straightening properties is likely to be deteriorated.

The content of a Mo component is in a range of 0.01% to 0.05% by mass.

When the content of the Mo component is within the above-described range, the hardness and the fatigue strength of the nitrocarburized steel material of the present invention and the automobile component formed of the aforementioned steel material are enhanced. When the content thereof is excessively high, the machinability is likely to be deteriorated, and in this case, it leads to cost increase.

The content of an s-Al component is equal to or less than 0.020% by mass.

s-Al means acid soluble Al.

When the content of the s-Al component is within the above-described range, the steel material of the present invention and the automobile component formed of the aforementioned steel material have the enhanced fatigue strength, and are excellent in the straightening properties.

When the content thereof is excessively high, the hardness tends to be varied. When the hardness is increased, the straightening properties tend to be deteriorated.

The content of a Ti component is equal to or less than 0.040% by mass.

Ti forms nitrides with N, suppresses the growth of the prior austenite grains during hot forging due to fine precipitation, refines the ferrite pearlite structure, and improves the bending straightening properties.

When the content thereof is excessively high, the amount of coarse TiN is increased and thus the machinability is likely to be deteriorated.

The content of a N component is 0.003% to 0.030% by mass, and is preferably equal to or greater than 0.010% by mass.

N forms nitrides with Ti, suppresses the growth of the prior austenite grains during hot forging due to fine precipitation, refines the ferrite pearlite structure, and improves the bending straightening.

When the content thereof is excessively high, coarse carbonitrides are generated, which causes cracks and the like, whereby the fatigue strength tends to be deteriorated.

The content of a Ca component is in a range of 0.0003% to 0.0060% by mass, is preferably equal to or greater than 0.0005% by mass, and is further preferably equal to or greater than 0.0015% by mass.

When the content of the Ca component is within the above-described range, the machinability is improved. On the other hand, even if the Ca component is increased more than necessary, the machinability is saturated and the hot workability tends to be deteriorated.

The content of an O component (oxygen component) is equal to or less than 0.010% by mass.

When the content of an O component is excessively high, coarse oxides are generated, which causes cracks and the like, whereby the fatigue strength tends to be deteriorated.

The steel material of the present invention is a steel material which includes C, Si, Mn, Cu, Ni, S, Cr, Mo, s-Al, Ti, N, Ca, and O at a specific ratio, and preferably includes at least one selected from the group consisting of V, Nb, and W within the following range, with the balance being Fe and unavoidable impurities.

V, Nb and W are the elements that combine with C so as to form a carbide, or combine with N so as to form a nitride, which contributes to the improvement of the strength of the steel material, and the steel material of the present invention may contain one element or two or more elements optionally selected among them.

In order to effectively exhibit such an effect, the content of a V component is preferably equal to or greater than 0.05% by mass, and is further preferably equal to or greater than 0.10% by mass.

Further, the content of an Nb component is preferably equal to or greater than 0.05% by mass, is further preferably equal to or greater than 0.08% by mass, and is still further preferably equal to or greater than 0.10% by mass.

In addition, the content of a W component is preferably equal to or greater than 0.2% by mass, is further preferably equal to or greater than 0.5% by mass, and is still further preferably equal to or greater than 0.7% by mass.

However, when the V, Nb, and W are excessively contained, the formed carbide or nitride causes the increase in the deformation resistance of the steel material and thus the workability is deteriorated in some cases.

Accordingly, the content of a V component is preferably equal to or less than 0.50% by mass, is preferably equal to or less than 0.40% by mass, and is further preferably equal to or less than 0.30% by mass.

In addition, the content of the Nb component is preferably equal to or less than 0.50% by mass, is further preferably equal to or less than 0.40% by mass, and is still further preferably equal to or less than 0.30% by mass.

Further, the content of the W component is preferably equal to or less than 2.0% by mass, is further preferably equal to or less than 1.5% by mass, and is still further preferably equal to or less than 1.0% by mass.

The steel material of the present invention is a steel material which includes C, Si, Mn, Cu, Ni, S, Cr, Mo, s-Al, Ti, N, Ca, and O at a specific ratio, and preferably further includes one kind or two or more kinds of Bi, Pb, Mg, Se, Te, Sn, Sb, REM, Zr, and B in the following range, with the balance being Fe and unavoidable impurities.

Note that, REM means a lanthanide element (fifteen elements from La through Lu), Sc (scandium), and Y (yttrium). Among them, the steel material of the present invention preferably includes at least one element selected from the group consisting of La, Ce, and Y, and further preferably includes at least one element selected from the group consisting of La and Ce.

Here, the steel material of the present invention is a steel material which includes C, Si, Mn, Cu, Ni, S, Cr, Mo, s-Al, Ti, N, Ca, and O at a specific ratio, preferably further includes at least one selected from the group consisting of V, Nb, and W in the above-described range, and further preferably includes one kind or two or more kinds of Bi, Pb, Mg, Se, Te, Sn, Sb, REM, Zr, and B in the following range, with the balance being Fe and unavoidable impurities.

Bi, Pb, Mg, Se, Te, Sn, Sb, REM, Zr, and B are elements that contribute to the improvement of the machinability, and the steel material of the present invention may contain one element or two or more elements optionally selected among them.

In order to effectively exhibit such an effect, the content of a Bi component is equal to or greater than 0.03% by mass, is further preferably equal to or greater than 0.08% by mass, and is still further preferably equal to or greater than 0.10% by mass.

Further, the content of a Pb component is equal to or greater than 0.03% by mass, is further preferably equal to or greater than 0.10% by mass, and is still further preferably equal to or greater than 0.15% by mass.

In addition, the content of a Mg component is equal to or greater than 0.0001% by mass, is further preferably equal to or greater than 0.0003% by mass, and is still further preferably equal to or greater than 0.0004% by mass.

Further, the content of a Se component is equal to or greater than 0.001% by mass, and is further preferably equal to or greater than 0.002% by mass.

In addition, the content of a Te component is equal to or greater than 0.001% by mass, and is further preferably equal to or greater than 0.002% by mass.

In addition, the content of a Sn component is equal to or greater than 0.002% by mass, is further preferably equal to or greater than 0.005% by mass, and is still further preferably equal to or greater than 0.010% by mass.

In addition, the content of a Sb component is equal to or greater than 0.002% by mass, is further preferably equal to or greater than 0.004% by mass, and is still further preferably equal to or greater than 0.006% by mass.

In addition, the content of an REM component is equal to or greater than 0.001% by mass, is further preferably equal to or greater than 0.002% by mass, and is still further preferably equal to or greater than 0.003% by mass.

In addition, the content of a Zr component is equal to or greater than 0.01% by mass, is further preferably equal to or greater than 0.03% by mass, and is still further preferably equal to or greater than 0.04% by mass.

In addition, the content of a B component is equal to or greater than 0.0005% by mass, and is further preferably equal to or greater than 0.0010% by mass.

However, when Bi, Pb, Mg, Se, Te, Sn, Sb, REM, Zr, and B are excessively contained, the strength is deteriorated, and whereby the adding effect of the machinability is saturated, which leads to cost increase.

Accordingly, the content of the Bi component is preferably equal to or less than 0.30% by mass, is further preferably equal to or less than 0.25% by mass, and is still further preferably equal to or less than 0.20% by mass.

Further, the content of the Pb component is preferably equal to or less than 0.30% by mass, is preferably equal to or less than 0.28% by mass, and is further preferably equal to or less than 0.25% by mass.

Further, the content of the Mg component is preferably equal to or less than 0.020% by mass, is further preferably equal to or less than 0.010% by mass, is still further preferably equal to or less than 0.0090% by mass.

In addition, the content of the Se component is preferably equal to or less than 0.30% by mass, is further preferably equal to or less than 0.25% by mass, and is still further preferably equal to or less than 0.20% by mass.

In addition, the content of the Te component is preferably equal to or less than 0.15% by mass, and is further preferably equal to or less than 0.10% by mass.

Further, the content of the Sn component is preferably equal to or less than 0.040% by mass, is further preferably equal to or less than 0.020% by mass, is still further preferably equal to or less than 0.018% by mass, and is particularly preferably equal to or less than 0.015% by mass.

In addition, the content of the Sb component is preferably equal to or less than 0.040% by mass, is further preferably equal to or less than 0.020% by mass, is still further preferably equal to or less than 0.015% by mass, and is particularly preferably equal to or less than 0.010% by mass.

In addition, the content of the REM component is preferably equal to or less than 0.05% by mass, and is further preferably equal to or less than 0.04% by mass.

Further, the content of the Zr component is preferably equal to or less than 0.50% by mass, is further preferably equal to or less than 0.45% by mass, and is still further preferably equal to or less than 0.40% by mass.

In addition, the content of the B component is preferably equal to or less than 0.0200% by mass, is further preferably equal to or less than 0.0180% by mass, and is still further preferably equal to or less than 0.0150% by mass.

In addition, examples of unavoidable impurities which can be contained in the steel include P.

P has a possibility of deteriorating the toughness of the steel, and thus the content thereof is preferably set to be equal to or less than 0.04% by mass.

The respective components in the steel material of the present invention satisfy Expression 1≥0.43 in a case where Expression 1=[C]+0.07×[Si]+0.16×[Mn]+0.19×[Cu]+0.17×[Ni]+0.20×[Cr]+0.40×[Mo] is established.

The value of Expression 1 is preferably equal to or less than 0.70, and is further preferably equal to or less than 0.65.

The present inventors have found that the value of Expression 1 relates to the hardness of a core (a portion other than the surface layer) of the steel material of the present invention.

When the value of Expression 1 is within the above-described range, the hardness and the fatigue strength of the steel material of the present invention tend to be enhanced.

Incidentally, each [ ] in Expression 1 indicates a content of the element shown therein in terms of % by mass. The same is true for the Expression 2 and Expression 3 to be described below.

The respective components of the steel material of the present invention satisfy Expression 2≥0.38 in a case where Expression 2=0.55×[C]+0.06×[Si]+0.18×[Mn]+0.09×[Cu]+0.47×[Mo]+[Cr] is established.

The value of Expression 2 is preferably equal to or less than 0.70, and is further preferably equal to or less than 0.60.

The present inventors have found that the value of Expression 2 relates to the hardness of the surface layer (a portion other than the core) of the steel material of the present invention.

When the value of Expression 2 is within the above-described range, the hardness and the fatigue strength of the steel material of the present invention tend to be enhanced.

The respective components in the steel material of the present invention satisfy 1.77≤Expression 3≤3.20 in a case where Expression 3=11×[Ca]/([N]+1.5×[O]).

The value of Expression 3 is preferably equal to or less than 3.0, and is further preferably equal to or less than 2.8.

The present inventors have found that the value of Expression 3 relates to the size of inclusions such as TiN that may be contained in the steel material of the present invention.

When the value of Expression 3 is excessively low, since inclusions such as TiN become coarse, the structure of the steel material also becomes coarse, whereby the straightening properties of the steel material of the present invention tend to be deteriorated. In contrast, when the value of Expression 3 is excessively high, coarse oxides are generated, whereby the fatigue strength tends to be deteriorated.

The steel material of the present invention has the above-described compositions, and in a case of further performing the hot forging (immediately after hot forging, and is not subjected to a thermal refining treatment), a cross-section structure of the steel has ferrite+pearlite (structure in which ferrite and pearlite coexist).

In a case where S0 represents the entire number (number/mm$^2$) of sulfides having a diameter of equal to or greater than 1.5 μm within 1 mm$^2$ of the cross section parallel to the rolling direction, S1 represents the number (number/mm$^2$) of sulfides which have a diameter of equal to or greater than 1.5 μm within 1 mm$^2$ of the cross section parallel to the rolling direction, and contain Ca of equal to or greater than 2.0%, and Expression 4=S1/S0 is established, the steel material of the present invention preferably satisfies Expression 4≥0.15, and further preferably satisfies Expression 4≥0.25.

In a case where the steel material of the present invention satisfies Expression 4, the fatigue strength thereof is further enhanced.

Note that, S0 and S1 are calculated as follows.

A sample is obtained by cutting 10 mm square piece from a portion of a distance of about ¼ of a diameter of a cross section of a round bar piece obtained by rolling or forging after the dissolution of the steel, or a portion of a distance of about ¼ of one side from the center to the one side in a cross section of a square bar piece. Next, the cross section (cross section parallel to the longitudinal direction) of the obtained sample is mirror polished and observed with a scanning electron microscope at about 450 times with a field of view of 100 mm$^2$ or more so as to capture a photograph. In addition, a diameter of the sulfide (inclusion) is measured from the obtained photograph. Then, an EDX analysis is performed so as to confirm types and compositions thereof.

Further, the steel material of the present invention may be a microalloyed steel in which thermal refining treatment (quenching/tempering) can be omitted after hot working. The steel material of the present invention is excellent in both of the strength (particularly, the fatigue strength) and the manufacturability (particularly, the bending straightening properties), and thus can be used as an automobile component such as a crankshaft by being formed into a product shape with the hot working (hot forging and the like) and the machining, being subjected to a high strength treatment such as a nitrocarburizing treatment, and then being subjected to the bending straightening.

In addition, the present invention relates to an automobile component formed of the steel material of the present invention as described above.

Further, preferred examples of the automobile component include a crankshaft.

EXAMPLES

<Manufacturing Test Piece>

Regarding the respective Invention steels 1 to 25 and Comparative steels A to F, which are indicated in Table 1, 150 kg of raw materials were mixed with each other so as to make a composition as illustrated in Table 1, and the mixture was melted in a vacuum melting furnace, and forged at 1250° C. to form a round bar having a cross section diameter of 70 mm. In this way, regarding the respective Invention steels 1 to 25 and Comparative steels A to F, two identical round rods were obtained.

Next, the forging and the like were performed under two conditions.

In Condition 1, the obtained round bar was heated at 1250° C. for two hours, was hot-forged into a bar-shaped piece having a cross section of 45 mm square at a finishing temperature of 1050° C., and then cooled down to room temperature at a cooling rate of 0.3° C./s.

In Condition 2, the obtained round bar was heated at 1300° C. for two hours, hot-forged into a round bar having a cross section of 30 mm in a diameter at a finishing temperature of 1050° C., and then cooled down to room temperature at a cooling rate of 0.6° C./s.

Figure 1:
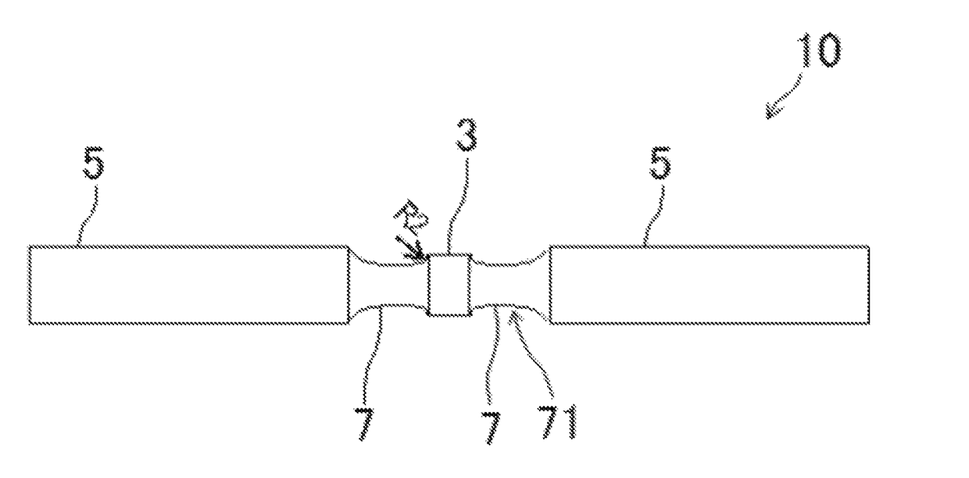
FIG. 1 is a schematic side view for illustrating a shape of a steel material used in Examples and a test piece obtained by heating the steel material.

Next, a round bar (length of 210 mm) having a cross section of 15 mm in a diameter was cut from a portion of a distance of about ¼ of one side from the center of the 45 mm square bar-shaped piece obtained under the above-described Condition 1 so as to obtain a steel material 10 including a parallel portion 3 having a diameter of 15 mm, a grip portion 5 having a diameter of 16 mm, and two test portions 7 at the center, as illustrated in FIG. 1.

Further, as illustrated in FIG. 1, the steel material 10 including the parallel portion 3 having a diameter of 15 mm, the grip portion 5 having a diameter of 16 mm, and two of the test portions 7 at the center was obtained from the bar-shaped piece having diameter of 30 mm which is obtained under the above-described Condition 2.

Here, a stress concentration portion having curvature radius of R2 was provided in the test portion 7. In addition, a diameter of a parallel portion 71 is 10 mm, and a length of the parallel portion 71 is approximately 20 mm in the test portion 7.

Subsequently, the steel material which is provided with the test portions 7 was subjected to the nitrocarburizing treatment at 600° C. for two hours so as to obtain a test piece. That is, the test piece is obtained by subjecting the nitrocarburizing treatment to the above-described steel material as illustrated in FIG. 1. Note that, the nitrocarburizing treatment used in Examples is a treatment of heating the steel material disposed in a gas containing a RX gas (one of modified gases) and a $NH_3$ gas at volume ratio 1:1 (or a gas containing a $NH_3$ gas, a $N_2$ gas, a $CO_2$ gas, at volume ratio of 50:45:5). The nitrocarburizing treatment which can be used in the present invention is not limited to such a specific nitrocarburizing treatment as long as it is a treatment in an atmosphere so as to generate sufficient compound layers on a surface layer of a target.

With such an operation, the test pieces (two types for each) relating to the respective Invention steels 1 to 25, and Comparative steels A to F were obtained as indicated in Table 1.

<Fatigue Strength>

Regarding the respective test pieces obtained as described above, a precision process was performed to make the diameter of the grip portion 15 mm, and then, fatigue test was conducted by using fatigue testing machine (equipment name: Ono-type rotating bending fatigue testing machine)

under the condition of 2500 rpm in the atmosphere at normal temperature so as to measure the fatigue strength of the respective test pieces.

The results are indicated in Table 1.

Note that, in a case where the fatigue strength is equal to or greater than 430 MPa of nominal stress, the evaluation is determined as "O", and in a case where the fatigue strength is less than 430 MPa, the evaluation is determined as "X".

<Bending Straightening Test>

Regarding each of the test pieces obtained as described above, a bending straightening test for three points of bending was conducted by applying a concentrated load to the parallel part 3 while supporting both end parts thereof at a support point distance of 182 mm. In the test, the load was applied until a crack occurred in the central test section, the maximum displacement (stroke) before the occurrence of the crack was measured by using software (WAVE logger).

The results are indicated in Table 1.

Note that, in a case where the stroke is equal to or greater than 7 mm, the evaluation is determined as "O", and in a case where the stroke is less than 7 mm, the evaluation is determined as "X".

TABLE 1

| | Types | \multicolumn{14}{c}{Chemical components (% by mass)} |
| --- | --- | --- | --- | --- | --- | --- | --- | --- | --- | --- | --- | --- | --- | --- | --- |
| | | C | Si | Mn | S | Cu | Ni | Cr | Mo | s-Al | Ti | N | Ca | O | Others |
| Invention steel | 1 | 0.28 | 0.15 | 0.99 | 0.060 | 0.10 | 0.10 | 0.05 | 0.02 | 0.010 | 0.010 | 0.003 | 0.0010 | 0.0018 | |
| | 2 | 0.30 | 0.19 | 1.05 | 0.055 | 0.15 | 0.12 | 0.15 | 0.01 | 0.008 | 0.011 | 0.010 | 0.0025 | 0.0035 | |
| | 3 | 0.28 | 0.17 | 0.99 | 0.060 | 0.30 | 0.25 | 0.10 | 0.01 | 0.007 | 0.027 | 0.027 | 0.0052 | 0.0027 | |
| | 4 | 0.32 | 0.19 | 0.78 | 0.140 | 0.14 | 0.09 | 0.19 | 0.02 | 0.005 | 0.010 | 0.010 | 0.0055 | 0.0070 | 0.16Nb |
| | 5 | 0.29 | 0.20 | 0.90 | 0.063 | 0.25 | 0.16 | 0.07 | 0.02 | 0.002 | 0.020 | 0.014 | 0.0033 | 0.0031 | |
| | 6 | 0.25 | 0.05 | 0.78 | 0.020 | 0.10 | 0.08 | 0.09 | 0.03 | 0.001 | 0.015 | 0.015 | 0.0041 | 0.0024 | |
| | 7 | 0.25 | 0.08 | 0.93 | 0.062 | 0.12 | 0.10 | 0.05 | 0.04 | 0.000 | 0.019 | 0.016 | 0.0050 | 0.0010 | |
| | 8 | 0.25 | 0.32 | 1.18 | 0.075 | 0.58 | 0.28 | 0.07 | 0.01 | 0.001 | 0.003 | 0.003 | 0.0007 | 0.0008 | |
| | 9 | 0.29 | 0.08 | 0.93 | 0.068 | 0.10 | 0.08 | 0.07 | 0.05 | 0.002 | 0.018 | 0.016 | 0.0032 | 0.0016 | |
| | 10 | 0.35 | 0.04 | 0.57 | 0.062 | 0.07 | 0.06 | 0.08 | 0.01 | 0.003 | 0.020 | 0.014 | 0.0032 | 0.0020 | |
| | 11 | 0.32 | 0.18 | 0.60 | 0.070 | 0.00 | 0.00 | 0.15 | 0.02 | 0.008 | 0.022 | 0.018 | 0.0036 | 0.0016 | |
| | 12 | 0 35 | 0.20 | 0.70 | 0.066 | 0.07 | 0.06 | 0.08 | 0 01 | 0.014 | 0.018 | 0.012 | 0.0032 | 0.0020 | 0.20Bi |
| | 13 | 0.21 | 0.22 | 1.46 | 0.058 | 0.20 | 0.28 | 0.12 | 0.03 | 0.018 | 0.036 | 0.010 | 0.0023 | 0.0018 | |
| | 14 | 0.34 | 0.30 | 1.18 | 0.074 | 0.20 | 0.25 | 0.17 | 0.04 | 0.016 | 0.010 | 0.003 | 0.0010 | 0.0018 | |
| | 15 | 0.27 | 0.12 | 0.88 | 0.087 | 0.14 | 0.09 | 0.05 | 0.02 | 0.010 | 0.030 | 0.013 | 0.0042 | 0.0031 | |
| | 16 | 0.29 | 0.15 | 1.03 | 0.080 | 0.25 | 0.16 | 0.06 | 0.02 | 0.014 | 0.022 | 0.017 | 0.0045 | 0.0024 | 0.0015B |
| | 17 | 0.35 | 0.26 | 0.93 | 0.074 | 0.10 | 0.08 | 0.05 | 0.01 | 0.018 | 0.025 | 0.018 | 0.0036 | 0.0010 | 0.20Pb |
| | 18 | 0.32 | 0.07 | 0.99 | 0.082 | 0.09 | 0.10 | 0.07 | 0.05 | 0.016 | 0.008 | 0.019 | 0.0050 | 0.0031 | |
| | 19 | 0.26 | 0.10 | 1.00 | 0.078 | 0.16 | 0.14 | 0.05 | 0.01 | 0.015 | 0.018 | 0.006 | 0.0040 | 0.0044 | 0.05Zr |
| | 20 | 0.28 | 0.21 | 0.86 | 0.070 | 0.08 | 0.10 | 0.05 | 0.02 | 0.009 | 0.013 | 0.019 | 0.0036 | 0.0020 | |
| | 21 | 0.34 | 0.09 | 0.84 | 0.086 | 0.03 | 0.02 | 0.05 | 0.01 | 0.013 | 0.017 | 0.017 | 0.0036 | 0.0023 | 0.10Nb |
| | 22 | 0.31 | 0.13 | 0.72 | 0.099 | 0.10 | 0.12 | 0.07 | 0.02 | 0.017 | 0.001 | 0.021 | 0.0040 | 0.0012 | |
| | 23 | 0.28 | 0.23 | 0.87 | 0.092 | 0.15 | 0.12 | 0.05 | 0.02 | 0.015 | 0.016 | 0.014 | 0.0031 | 0.0031 | 0.10V |
| | 24 | 0.31 | 0.18 | 0.60 | 0.070 | 0.00 | 0.00 | 0.15 | 0.02 | 0.008 | 0.022 | 0.003 | 0.0015 | 0.0010 | |
| | 25 | 0.31 | 0.18 | 0.60 | 0.070 | 0.00 | 0.00 | 0.15 | 0.02 | 0.008 | 0.022 | 0.003 | 0.0008 | 0.0010 | |
| Comparative steel | A | 0.29 | 0.08 | 0.85 | 0.062 | 0.08 | 0.08 | 0.18 | 0.02 | 0.002 | 0.019 | 0.016 | 0.0032 | 0.0040 | |
| | B | 0.30 | 0.10 | 0.93 | 0.070 | 0.01 | 0.08 | 0.07 | 0.01 | 0.004 | 0.015 | 0.015 | 0.0058 | 0.0020 | 0.10Nb |
| | C | 0.27 | 0.19 | 0.80 | 0.045 | 0.07 | 0.10 | 0.02 | 0.03 | 0.016 | 0.008 | 0.010 | 0.0025 | 0.0033 | |
| | D | 0.25 | 0.16 | 0.60 | 0.060 | 0.10 | 0.08 | 0.13 | 0.02 | 0.008 | 0.010 | 0.016 | 0.0032 | 0.0015 | |
| | E | 0.30 | 0.19 | 1.05 | 0.055 | 0.15 | 0.12 | 0.15 | 0.01 | 0.025 | 0.011 | 0.010 | 0.0025 | 0.0035 | |
| | F | 0.28 | 0.23 | 0.95 | 0.092 | 0.04 | 0.03 | 0.25 | 0.02 | 0.015 | 0.016 | 0.014 | 0.0031 | 0.0031 | |

| | | Specific Expression | | | | Condition 1 | | | | Condition 2 | | | |
| --- | --- | --- | --- | --- | --- | --- | --- | --- | --- | --- | --- | --- | --- |
| | Types | Expression 1 | Expression 2 | Expression 3 | Expression 4 | Fatigue strength (MPa) | Evaluation | Stroke (mm) | Evaluation | Fatigue strength (MPa) | Evaluation | Stroke (mm) | Evaluation |
| Invention steel | 1 | 0.50 | 0.41 | 1.93 | 0.46 | 482 | O | 9.4 | O | 492 | O | 9.0 | O |
| | 2 | 0.56 | 0.53 | 1.80 | 0.46 | 494 | O | 7.6 | O | 504 | O | 7.4 | O |
| | 3 | 0.57 | 0.47 | 1.84 | 0.51 | 500 | O | 8.8 | O | 510 | O | 8.5 | O |
| | 4 | 0.55 | 0.54 | 2.95 | 0.52 | 510 | O | 11.9 | O | 525 | O | 11.6 | O |
| | 5 | 0.54 | 0.43 | 1.95 | 0.51 | 510 | O | 9.5 | O | 518 | O | 9.2 | O |
| | 6 | 0.44 | 0.39 | 2.42 | 0.52 | 440 | O | 10.2 | O | 450 | O | 9.9 | O |
| | 7 | 0.47 | 0.39 | 3.14 | 0.55 | 444 | O | 10.6 | O | 458 | O | 11.0 | O |
| | 8 | 0.64 | 0.50 | 1.83 | 0.57 | 530 | O | 8.0 | O | 538 | O | 7.8 | O |
| | 9 | 0.51 | 0.43 | 1.91 | 0.62 | 492 | O | 9.2 | O | 502 | O | 9.0 | O |
| | 10 | 0.49 | 0.39 | 2.07 | 0.65 | 478 | O | 10.0 | O | 488 | O | 9.7 | O |
| | 11 | 0.47 | 0.45 | 1.94 | 0.64 | 458 | O | 9.0 | O | 474 | O | 8.7 | O |
| | 12 | 0.52 | 0.42 | 2.35 | 0.66 | 500 | O | 9.6 | O | 510 | O | 9.2 | O |
| | 13 | 0.58 | 0.54 | 1.99 | 0.37 | 505 | O | 7.9 | O | 514 | O | 7.6 | O |
| | 14 | 0.68 | 0.62 | 1.93 | 0.34 | 530 | O | 9.4 | O | 540 | O | 9.0 | O |
| | 15 | 0.48 | 0.39 | 2.62 | 0.43 | 487 | O | 10.7 | O | 497 | O | 10.0 | O |
| | 16 | 0.56 | 0.44 | 2.40 | 0.43 | 500 | O | 8.1 | O | 510 | O | 7.5 | O |
| | 17 | 0.56 | 0.44 | 2.03 | 0.34 | 490 | O | 9.3 | O | 502 | O | 9.0 | O |
| | 18 | 0.55 | 0.46 | 2.33 | 0.32 | 505 | O | 10.1 | O | 515 | O | 9.8 | O |
| | 19 | 0.50 | 0.40 | 3.49 | 0.42 | 482 | O | 11.0 | O | 496 | O | 10.5 | O |
| | 20 | 0.48 | 0.39 | 1.80 | 0.41 | 475 | O | 9.7 | O | 484 | O | 9.0 | O |
| | 21 | 0.50 | 0.40 | 1.94 | 0.32 | 460 | O | 8.0 | O | 470 | O | 7.7 | O |

TABLE 1-continued

|  | | C | Si | Mn | S | | | | | | | | |
|---|---|---|---|---|---|---|---|---|---|---|---|---|---|
|  | 22 | 0.50 | 0.40 | 1.93 | 0.29 | 457 | ○ | 9.5 | ○ | 467 | ○ | 9.2 | ○ |
|  | 23 | 0.50 | 0.40 | 1.83 | 0.39 | 448 | ○ | 9.4 | ○ | 458 | ○ | 9.0 | ○ |
|  | 24 | 0.46 | 0.45 | 1.96 | 0.22 | 452 | ○ | 9.4 | ○ | 462 | ○ | 8.8 | ○ |
|  | 25 | 0.46 | 0.45 | 1.96 | 0.13 | 432 | ○ | 9.4 | ○ | 441 | ○ | 9.0 | ○ |
| Comparative steel | A | 0.50 | 0.51 | 1.60 | 0.38 | 478 | ○ | 6.6 | X | 482 | ○ | 6.3 | X |
|  | B | 0.49 | 0.41 | 3.54 | 0.36 | 416 | X | 11.2 | ○ | 426 | X | 9.0 | ○ |
|  | C | 0.46 | 0.34 | 1.84 | 0.34 | 408 | X | 12.0 | ○ | 415 | X | 11.7 | ○ |
|  | D | 0.42 | 0.40 | 1.93 | 0.43 | 420 | X | 9.2 | ○ | 435 | ○ | 9.0 | ○ |
|  | E | 0.56 | 0.53 | 1.80 | 0.42 | 494 | ○ | 7.6 | ○ | 515 | ○ | 6.6 | X |
|  | F | 0.52 | 0.60 | 1.83 | 0.39 | 498 | ○ | 6.8 | X | 508 | ○ | 6.3 | X |

As indicated in Table 1, it was found that all Invention steels 1 to 25 had enhanced fatigue strength and were excellent straightening properties.

It can be said that the steel material such as Invention steels 1 to 25 is a microalloyed steel in which thermal refining treatment (quenching/tempering) can be omitted after hot working. The steel material is excellent in both of the strength (particularly, the fatigue strength) and the manufacturability (particularly, the bending straightening properties), and thus can easily return to the original shape by being formed into a product shape with the hot working (hot forging and the like) and the machining, being subjected to a high strength treatment such as a nitrocarburizing treatment, and then being subjected to the bending straightening. Accordingly, the steel material can be suitably used as an automobile component such as a crankshaft.

In contrast, Comparative steel A has the deteriorated bending straightening properties. The reason for this is probably the excessively low value of Expression 3 in Comparative steel A.

Further, Comparative steel B has the deteriorated fatigue strength. The reason for this is probably the excessively high value of Expression 3 in Comparative steel B.

Further, Comparative steel C has the deteriorated fatigue strength. The reason for this is probably the excessively low value of Expression 2 in Comparative steel C.

Further, Comparative steel D has the deteriorated fatigue strength under Condition 1. The reason for this is probably the excessively low value of Expression 1 in Comparative steel D.

Further, Comparative steel E has the deteriorated bending straightening properties under Condition 2. The reason for this is probably the excessively high content of s-Al in Comparative steel E.

Further, Comparative steel F has the deteriorated bending straightening properties. The reason for this is probably the excessively high content of Cr in Comparative steel F.

The present application is based on Japanese patent application No. 2016-076209 filed on Apr. 5, 2016 and Japanese patent application No. 2017-043952 filed on Mar. 8, 2017, and the contents of which are incorporated herein by reference.

What is claimed is:

1. An automobile component obtained by hot-forging and nitrocarburizing a steel material comprising, in terms of % by mass:
   C: 0.20% to 0.35%;
   Si: 0.01% to 0.35%;
   Mn: 0.55% to 1.50%;
   Cu: equal to or less than 0.60%;
   Ni: equal to or less than 0.30%;
   S: 0.01% to 0.15%;
   Cr: 0.01% to 0.20%;
   Mo: 0.01% to 0.05%;
   s-Al: equal to or less than 0.020%;
   Ti: 0.015% to 0.040%;
   N: 0.003% to 0.030%;
   Ca: 0.0003% to 0.0060%; and
   O: equal to or less than 0.010%,
   with the balance being Fe and unavoidable impurities,
   wherein 0.43≤Expression 1≤0.70 is satisfied in a case where Expression 1=[C]+0.07×[Si]+0.16×[Mn]+0.19×[Cu]+0.17×[Ni]+0.20×[Cr]+0.40×[Mo] is established,
   0.38≤Expression 2≤0.70 is satisfied in a case where Expression 2=0.55×[C]+0.06×[Si]+0.18×[Mn]+0.09×[Cu]+0.47×[Mo]+[Cr] is established, and
   1.77≤Expression 3≤3.0 is satisfied in a case where Expression 3=11×[Ca]/([N]+1.5×[O]) is established, and
   in which each [ ] in Expressions 1 to 3 indicates a content of the element shown therein in terms of % by mass, and
   wherein, in a case where S0 represents an entire number (number/mm$^2$) of sulfides having a diameter of equal to or greater than 1.5 μm within 1 mm$^2$ of a cross section parallel to a rolling direction, S1 represents a number (number/mm$^2$) of sulfides which have a diameter of equal to or greater than 1.5 μm within 1 mm$^2$ of the cross section parallel to the rolling direction and which contain Ca, and Expression 4=S1/S0 is established, Expression 4≥0.15 is satisfied.

2. The automobile component of claim 1, further comprising, in terms of % by mass, at least one of:
   at least one selected from the group consisting of:
   V: equal to or less than 0.50%;
   Nb: equal to or less than 0.50%; and
   W: equal to or less than 2.0%, and
   one kind or two or more kinds of:
   Bi: equal to or less than 0.30%;
   Pb: equal to or less than 0.30%;
   Mg: equal to or less than 0.020%;
   Se: equal to or less than 0.30%;
   Te: equal to or less than 0.15%;
   Sn: equal to or less than 0.040%;
   Sb: equal to or less than 0.040%;
   REM: equal to or less than 0.05%;
   Zr: equal to or less than 0.50%; and
   B: equal to or less than 0.0150%.

3. The automobile component of claim 1, wherein the automobile component comprises a crankshaft.

4. The automobile component of claim 1, wherein the unavoidable impurities comprise P, and a content of P in terms of % by mass is equal to or less than 0.04%.

5. The automobile component of claim 1, wherein the steel material comprises microalloyed steel which is not quenched and not tempered.

6. The automobile component of claim 1, wherein, in terms of % by mass:

Ti: 0.020% to 0.040%.

7. The automobile component of claim 1, wherein, in terms of % by mass:

Ti: 0.015% to 0.020%.

8. The automobile component of claim 2, wherein the automobile component comprises a crankshaft.

9. The automobile component of claim 6, wherein, in terms of % by mass:

Mo: 0.02% to 0.05%.

* * * * *